Oct. 6, 1942.        W. G. CLARK                2,297,747
            PROCESS AND APPARATUS FOR REDUCING ORE
                Filed Aug. 19, 1941        2 Sheets-Sheet 1
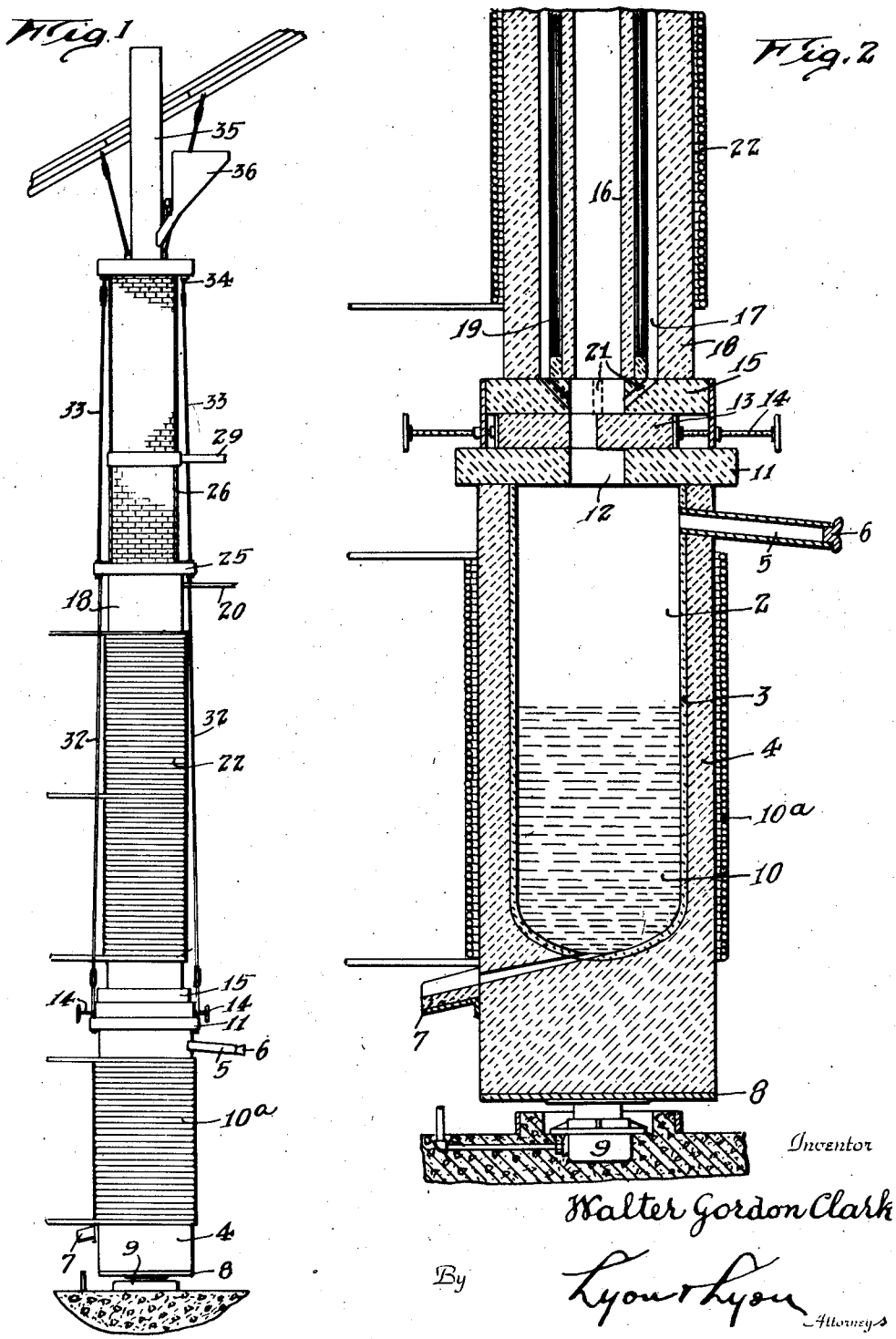
Inventor
Walter Gordon Clark
By Lyon & Lyon
    Attorneys Oct. 6, 1942.  W. G. CLARK  2,297,747
PROCESS AND APPARATUS FOR REDUCING ORE
Filed Aug. 19, 1941  2 Sheets-Sheet 2
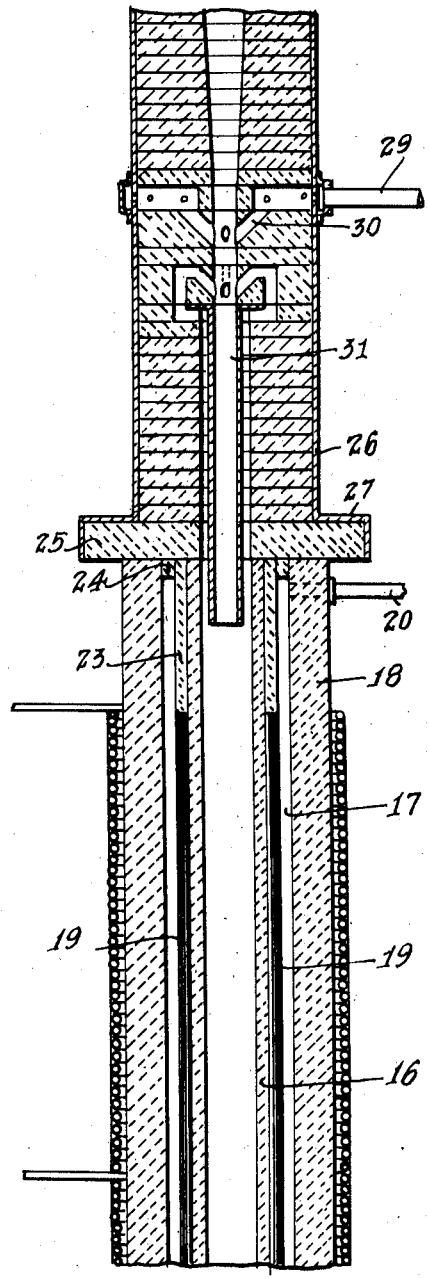
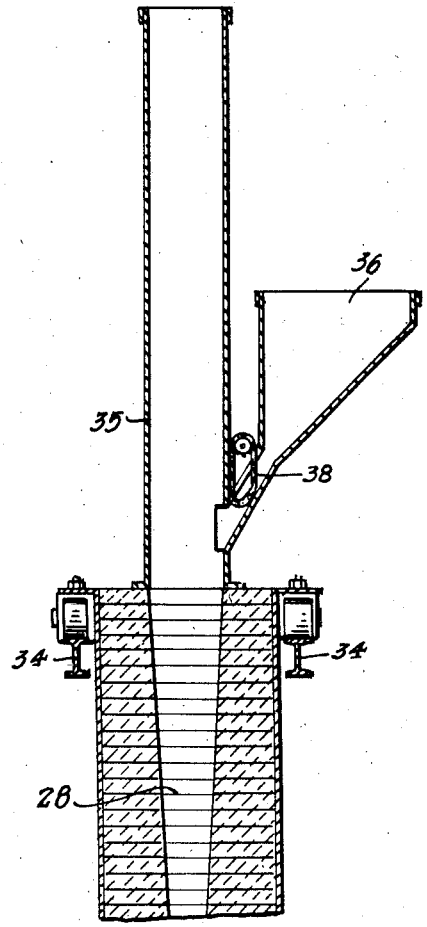
Inventor
Walter Gordon Clark
By Lyon & Lyon
Attorneys Patented Oct 6, 1942

2,297,747

UNITED STATES PATENT OFFICE 2,297,747

PROCESS AND APPARATUS FOR REDUCING ORES

Walter Gordon Clark, Los Angeles, Calif., assignor to Clarkiron, Inc., Los Angeles, Calif., a corporation of Nevada Application August 19, 1941, Serial No. 407,495

6 Claims. (Cl. 75—10)

This invention relates to a process and apparatus for reducing ore, and refers particularly to a process and apparatus for reducing an oxide ore of a metal which is not detrimentally affected by carbon in the reducing operations. Thus, the invention is of particular value for reducing oxides, such as tin oxide, aluminum oxide, magnesium oxide, and beryllium oxide.

The invention also relates to a process and apparatus employing an electric melting furnace of the so-called induction type, in which an alternating current of proper frequency circulates in a coil or helix surrounding a conducting core, and generates heat in the conducting core as a short-circuited secondary.

The process and apparatus of the present invention is intended for the reduction of oxides, such as tin oxide, etc., to metal by the reducing action of a gaseous reducing agent, and is particularly intended to enable the use of a hydrocarbon gas, such as natural gas, in the reducing operations. In order to efficiently carry out a reducing action with hydrocarbon gases, the temperature of the reducing operations should be capable of careful control. I have found that this reducing action can very efficiently be carried out in a process and apparatus in which the reduction operation is made to take place in a long narrow refractory subjected to induction heating, which refractory is arranged to discharge the reduced molten metal into a relatively large accumulating zone. One or a number of such narrow refractory reducing chambers may be associated with a single accumulating zone. The reducing operation is made to take place continuously as the ore descends through the narrow refractory to the reducing action of said hydrocarbon gas.

In such reducing operations, it is necessary to heat the ore and hydrocarbon gases to temperatures sufficiently high so that the hydrocarbon gas undergoes some decomposition in the process resulting in the deposit of carbon in the preheating zones of the apparatus. The process and apparatus of the present invention include the provision of a means by which the preliminary heating zones for heating the hydrocarbon gas to the proper reaction temperature may be treated for the removal of carbon deposited by the decomposition of the hydrocarbon gas.

The apparatus of the present invention includes a long narrow reducing zone formed by a refractory heated by a plurality of carbon rods acting as a short-circuited secondary of an induction furnace. The carbon rods are mounted in an annular chamber back of the refractory forming the reducing zone, which annular chamber forms a preliminary heating passage for the hydrocarbon gases. The hydrocarbon gas may thus be introduced into the reducing refractory under proper temperature conditions. The decomposition of the hydrocarbon gas taking place in said preheating passage results in the deposit therein of a carbon in a loose form. In accordance with the process and apparatus of the present invention, this carbon may be periodically removed from the preliminary heating passage by discontinuing the passage of the hydrocarbon gas and for a short period of time passing air through the passage to convert the carbon into carbon monoxide gas. The carbon monoxide gas so formed may be passed through the reducing passage of the apparatus and used for effecting some reduction of the ore, although the carbon monoxide gas is not as effective a reducing agent as the hydrocarbon gas.

The process and apparatus of the present invention will be fully understood from the following description of the preferred form or example of the process and apparatus, the description being made with reference to the accompanying drawings, in which Figure 1 is a front elevation of the furnace.

Figure 2 is an enlarged vertical section of the lower portion of the furnace.

Figure 3 is an enlarged vertical section of the central portion of the furnace.

Figure 4 is an enlarged vertical section of the top portion of the furnace.

Referring to the drawings, the apparatus of the present invention includes an accumulating zone 2 formed by an inner refractory liner 3 designed for withstanding high temperatures and surrounded by an outer refractory 4. Near the upper end of the accumulating zone, an outlet 5 is provided for the removal of slag, which outlet is normally closed by a stopper 6. An outlet 7 is also provided from a lower end of the accumulating zone, by means of which the reduced metal, such as 10, may be continuously or intermittently removed. In the preferred form of the apparatus the accumulating zone is supported on a plate 8 mounted upon a hydraulic jack 9, which provides a means by which the various sections of the apparatus may be separated from each other for repair purposes. In order to maintain the contents of the accumulating zone at molten temperature, a coil or helix 10a surrounds the accumulating chamber, which coil or helix may be formed of water pipe and through which alternating current may be passed for inducing heat in the accumulating zone and through which water may be passed for cooling the coil.

At the top of the accumulating zone I provide a refractory roof member 11, which is provided with one or more openings 12 for the introduction into said accumulating zone of the molten metal. The accumulating chamber may be sufficiently large to accumulate molten metal from a plurality of reducing passages, in which case the same are separately mounted over the accumulating chamber and the roof 11 is provided with a plurality of openings 12, one corresponding to each reducing passage used. By essentially separating the reaction or reducing portions of the furnace from the storage or accumulating portions of the furnace, I have found it possible to very materially reduce the destruction of the refractories. It is necessary then only to heat the refractories forming the reducing passages to the high reaction temperatures, while lower temperatures less destructive to the refractories may be maintained at the accumulating zone.

Above the roof member 11 and for cooperation with the orifice 12 thereof I provide movable refractory blocks 13 associated with screws 14, by means of which they may be adjusted relative to the opening 12 to act as a valve for the accumulating chamber. By this means the contents of the reducing zone may be held from passing into the accumulating zone until the desired reduction operations have occurred. Above the valve member 13 I provide a refractory base 15 for the reducing chamber of the furnace. The reducing chamber of the furnace includes a long narrow refractory tube 16 formed of a high temperature refractory, the bore of which forms the reaction or the reducing chamber of the furnace. Surrounding the refractory tube 16 and spaced therefrom to leave an annular chamber 17 is provided an outer refractory tube 18. Within the annular chamber 17 and against the refractory tube 16 I provide a plurality of carbon or graphite rods 19 to act as a short-circuited secondary of an induction furnace, which rods 19, however, do not fill the annular passage 17 but leave a portion of such passage open for the flow of hydrocarbon gas. At the upper end of the refractory 18 I provide an inlet 20, through which the hydrocarbon gases for the process may be introduced, and at the lower end of the passage 17 ports 21 are formed in the base 15 for allowing the introduction of the heated hydrocarbon gas into the bore of the refractory 16. Surrounding the refractory tube 18, I provide suitable water-cooled electric heating coils 22, preferably formed in two or more sections for better regulation of the temperatures employed. At the upper end of the rods 19 a short tube 23 of insulating material, such as magnesia insulation, is provided, and spacers 24 of carbon or refractory are provided to maintain the inner and outer tubes suitably spaced apart.

A roof 25 is provided for the reaction chamber upon which there is indicated as mounted a chamber for subjecting the ore to a preliminary heating, roasting, and ore oxidizing treating. The preliminary roasting or oxidizing chamber is provided by a shell 26 mounted on a plate 27 on the roof 25, and including refractories forming a passage 28 for the ore to be processed, which passage tapers to expand upwardly at its upper portion. In the medial portion of the oxidizing and roasting zone an air inlet 29 is provided having suitable openings 30 for distributing the air. Below the air inlet there is provided a tube 31 for conducting the ore into the reducing chamber.

For suspending the weight of the roasting zone and the reducing zone of the apparatus, I have indicated a series of rod supports 32 connected between the roof 11 of the accumulating chamber and roof 25 of the reducing chamber, and a second series of rods 33 leading to the upper end of the oxidizing or roasting zone where the apparatus may be supported from beams 34. The upper end of the roasting and reducing zone leads to a stack 35 which communicates with a hopper 36 having a chain feed control 38 for controlling the feed of ore to the apparatus.

In the operation of the process and apparatus of the present invention the process and apparatus may be employed for reducing any oxides where the presence of carbon is not detrimental and is found particularly suitable for treatment of tin, aluminum, and magnesium oxide ores, and also beryllium oxide ores. I have found the apparatus most valuable for reducing cassiterite. The ore before being introduced into the apparatus is preferably crushed and screened to +16 to —¼ inch, and the fines of the ore should be briquetted, crushed, and screened. In the preliminary oxidizing and roasting zone 28 temperatures of about 1500° F. at the point of introduction of air to about 1200° F. at the upper end of the zone are maintained where tin oxide ores are to be treated.

The most suitable temperature for the reduction of tin ore by hydrocarbon gas is around 2100 or 2200° F., and in the operation of the apparatus I maintain temperatures of from 2700° F. to 1500° F. in the reducing chamber formed by the refractory 16, the higher temperatures being maintained at the lower end of said zone.

The supply of ore to the apparatus is so regulated as to provide for a continuous flow of air with the continuous discharge of the reduced metal into the accumulating chamber 2. Periodically, in the operations of the apparatus, a considerable deposit of carbon will accumulate in the annular preheating passage 17 for the hydrocarbon gases. When this occurs, the passage of the hydrocarbon gases is discontinued and for a short period of time air is directed through the passages 17 for a sufficient period of time to convert the loose carbon therein to carbon monoxide gas. It is unnecessary to discontinue the reducing operations as said carbon monoxide gas effects to some degree reducing actions. As soon as the loose carbon in the preliminary passage 17 has been consumed by the air the passage of air should be discontinued in order not to attack the carbon rods 19. I have found that as long as there is any loose carbon in the passage 17 from the decomposition of the hydrocarbon gas there is substantially no attack on the carbon of the rods 19.

While it is preferable to burn the carbon to carbon monoxide gas, partial conversion to carbon dioxide gas is to be expected. Another alternative of the process of the present invention is to introduce steam into the preheating passage 17 for reducing the loose carbon there deposited to carbon monoxide and hydrogen.

While the process and apparatus herein described are very effective for the reduction of ores, such as tin oxide, aluminum oxide, magnesium oxide, and beryllium oxide ores, it is to be understood that various modifications and changes may be made without departing from the principles of the present invention, and the present invention includes all such modifications and changes as come within the scope of the appended claims.

I claim:

1. A process of reducing ores, which comprises heating carbon elements by inducing electric currents therein, passing the hydrocarbon gas over said carbon elements to be heated thereby to a desired reaction temperature, then passing the hydrocarbon gas through a narrow reducing zone enclosed by and likewise heated by said carbon elements, and causing oxide ore to descend through said reducing zone countercurrently to the movement of said hydrocarbon gas.

2. A process of reducing ores, which comprises heating carbon elements by inducing electric currents therein, passing the hydrocarbon gas over said carbon elements to be heated thereby to a desired reaction temperature, then passing the hydrocarbon gas through a narrow reducing zone enclosed by and likewise heated by said carbon elements, causing oxide ore to descend through said reducing zone countercurrently to the movement of said hydrocarbon gas, and periodically interrupting the passage of the hydrocarbon gas and in place thereof passing air over said carbon elements and into said reducing zone to convert carbon deposited around said carbon elements from the decomposition of said hydrocarbon gas to carbon monoxide gas while using said carbon monoxide gas for the reduction of ore in said reducing zone.

3. An apparatus for reducing ores, which comprises a narrow vertical refractory forming a reducing chamber, an annular chamber surrounding said reducing chamber and having carbon elements therein, an electric coil for introducing currents into said carbon elements for heating said reducing chamber and said annular chamber, means for causing the ore to be reduced to descend said reducing chamber, and means for directing the flow of hydrocarbon gas first through said annular chamber and into said reducing chamber.

4. An apparatus for reducing ores, which comprises a narrow vertical refractory forming a reducing chamber, an annular chamber surrounding said reducing chamber and having carbon elements therein, an electric coil for introducing currents into said carbon elements for heating said reducing chamber and said annular chamber, means for causing the ore to be reduced to descend said reducing chamber, means for directing the flow of hydrocarbon gas first through said annular chamber and into said reducing chamber, and an accumulation chamber disposed beneath said reducing chamber, and means for regulating the flow of materials from said reducing chamber to said accumulating chamber so that substantially only reduced molten metal passes to said accumulating chamber.

5. An apparatus for reducing ores, which apparatus comprises an accumulating chamber, a relatively narrow vertical reducing chamber disposed over said accumulating chamber, means regulating the passage of materials from said reducing chamber to said accumulating chamber, means forming an annular chamber surrounding said reducing chamber, carbon elements disposed within said annular chamber, means for introducing electric currents into said carbon elements for heating said reducing chamber and said annular chamber, and means for directing the flow of gas through said annular chamber and into said reducing chamber.

6. An apparatus for reducing ores, comprising an accumulation chamber, means for heating the accumulation chamber, a superimposed reducing chamber formed by a relatively narrow long refractory, means for regulating the communication between the accumulating chamber and reducing chamber, means forming an annular chamber around said refractory, carbon elements in said annular chamber, an electric coil for inducing current in said carbon elements, and means for directing the flow of gas through said annular chamber and into said reducing chamber.

WALTER GORDON CLARK.